3,012,065
PREPARATION OF DIBENZYL PHTHALATE
Robert H. Mills, Webster Groves, Mo., assignor to Monsanto Chemical Company, St. Louis, Mo., a corporation of Delaware
No Drawing. Filed Oct. 8, 1958, Ser. No. 766,155
6 Claims. (Cl. 260—475)

This invention relates to a method of preparing dibenzyl phthalate by the reaction of benzyl chloride and alkali metal phthalate in aqueous solution maintained within a prescribed pH range.

More particularly, this invention involves the reaction of benzyl chloride and an alkali metal phthalate in aqueous solution at a pH range of about 8.2 to 10, which pH range is maintained by the addition of alkali metal base as required.

The following non-limiting example further illustrates the invention. Parts are parts by weight.

*Example*

Disodium phthalate was first prepared by charging to a suitable reaction vessel 110 parts of phthalic anhydride, about 60 parts of sodium hydroxide (94%) and about 90 parts of water. After the formation of the disodium phthalate was completed, the pH of the solution was adjusted to about 9 by adding a small amount of sodium hydroxide. With the above reaction mass at a temperature of about 111° C., the addition of benzyl chloride was started. Two and four-tenths parts of triethylamine were also added as a catalyst. Over a period of about 45 minutes, about 237 parts of benzyl chloride were added while maintaining the temperature in the range of about 106° C. to about 117° C. and the pH in the range of about 8.2 to 10 by the addition of sodium carbonate as needed. After all the benzyl chloride has been added, the reaction was maintained within the above temperature range for an additional 3 hours, while still maintaining the required pH by the addition of sodium carbonate as required.

Thereafter the reaction mass was washed with hot water for about 15 minutes, sodium carbonate being added as needed to maintain the pH of said mass in the range of 8.2 to 10. The reaction mass was then steamed at a temperature or about 110° C. to 120° C. and a total pressure of about 100–120 mm. of mercury, from which operation there remained an ester-containing residue. The residue was given a basic wash, two water washes and dried, after which there remained 207 parts of dibenzyl phthalate having an $n_D^{25}$ of 1.5803. About 53 parts of unreacted benzyl chloride were recovered from a fraction from the steam distillation by vacuum distillation, and about 21 parts of unreacted phthalic acid were recovered from the wash water by acidification and filtration thereof. The actual yield of dibenzyl phthalate, based on phthalic anhydride, was therefore better than 95%.

It should be noted that, although a catalyst such as the trialkylamines, e.g., triethylamine, was used in the above experiments, the process of the invention can be conducted without a catalyst and without a reduction in yield, but the time for completion of the reaction will be necessarily increased. Other catalyst than the trialkylamines can, of course, be used, such as other amines, e.g., dicyclohexylamine.

In addition to the alkali metal bases used in the above examples to maintain the desired pH during the esterification reaction, there can also be used in the process of this invention potassium carbonate, potassium hydroxide, potassium bicarbonate, sodium hydroxide, sodium bicarbonate, lithium hydroxide, lithium carbonate, lithium bicarbonate, and other suitable metal bases.

The temperatures which are employed in the process of this invention can be varied without any appreciable depreciation in yield of dibenzyl phthalate from the usual yield of about 95% or more as shown in the example. Normally, temperatures in the range of 100° C. to 125° C. are adequate.

What is claimed is:
1. In a process for producing dibenzyl phthalate, the step comprising reacting benzyl chloride with an aqueous solution of alkali metal phthalate while maintaining the pH of said solution within the range of about 8.2 to 10 by the addition of alkali metal base.
2. A method of claim 1 wherein the alkali metal base is sodium hydroxide.
3. A method of claim 1 wherein the alkali metal base is sodium carbonate.
4. In a process for producing dibenzyl phthalate, the step comprising reacting benzyl chloride with an aqueous solution of disodium phthalate while maintaining the pH of said solution within the range of about 8.2 to 10 by the addition of alkali metal base.
5. A method of claim 4 wherein the alkali metal base is sodium hydroxide.
6. A method of claim 4 wherein the alkali metal base is sodium carbonate.

References Cited in the file of this patent
UNITED STATES PATENTS
2,617,820     Gamrath et al.           Nov. 11, 1952

OTHER REFERENCES
Lyman et al.: J. Am. Chem. Soc., 39, 709–711 (1917).
Gomberg et al.: J. Am. Chem. Soc, 42, 2059 to 2072 (1920).
Groggins: "Unit Processes in Organic Synthesis," pp. 624–5 (1952), McGraw-Hill.
Wagner et al.: "Synthetic Organic Chemistry," p. 484 (1953), J. Wiley.